(12) United States Patent
Lin et al.

(10) Patent No.: US 11,182,527 B2
(45) Date of Patent: Nov. 23, 2021

(54) CELL PLACEMENT SITE OPTIMIZATION

(71) Applicant: Taiwan Semiconductor Manufacturing Co., Ltd., Hsinchu (TW)

(72) Inventors: Yen-Hung Lin, Hsinchu (TW); Chung-Hsing Wang, Hsinchu (TW); Yuan-Te Hou, Hsinchu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

(21) Appl. No.: 16/837,449

(22) Filed: Apr. 1, 2020

(65) Prior Publication Data

US 2020/0226316 A1   Jul. 16, 2020

Related U.S. Application Data

(63) Continuation of application No. 15/882,288, filed on Jan. 29, 2018, now Pat. No. 10,642,949.

(Continued)

(51) Int. Cl.
*G06F 30/392*   (2020.01)
*G06F 30/39*   (2020.01)
(Continued)

(52) U.S. Cl.
CPC ............ *G06F 30/392* (2020.01); *G06F 30/30* (2020.01); *G06F 30/347* (2020.01); *G06F 30/39* (2020.01);
(Continued)

(58) Field of Classification Search
CPC .... G06F 30/392; G06F 2111/20; G06F 30/39; G06F 30/30; G06F 30/398; G06F 30/347; H01L 27/0207; H01L 29/06
See application file for complete search history.

(56) References Cited

U.S. PATENT DOCUMENTS 5,818,729 A    10/1998  Wang et al.
6,075,934 A *   6/2000  Chiluvuri ......... H01L 27/11807
                                                  716/122
(Continued)

FOREIGN PATENT DOCUMENTS

CN    104604357 A    5/2015
CN    104615793 A    5/2015
(Continued)

*Primary Examiner* — Helen Rossoshek
(74) *Attorney, Agent, or Firm* — Sterne, Kessler, Goldstein & Fox P.L.L.C.

(57) ABSTRACT

The present disclosure describes an example method for cell placement in an integrated circuit (IC) layout design. The method includes partitioning a layout area into one or more contiguous units, where each unit includes a plurality of placement sites. The method also includes mapping a first set of pin locations and a second set of pin locations to each of the one or more contiguous units. The method further includes placing a cell in the one or more contiguous units, where the cell is retrieved from a cell library that includes a plurality of pin locations for the cell. The placement of the cell is based on an allocation of one or more pins associated with the cell to at least one of a pin track from the first plurality of pin locations, a pin track from second plurality of pin locations, or a combination thereof.

20 Claims, 6 Drawing Sheets

Related U.S. Application Data

(60) Provisional application No. 62/516,532, filed on Jun. 7, 2017.

(51) Int. Cl.
   *G06F 30/30* (2020.01)
   *G06F 30/347* (2020.01)
   *H01L 27/02* (2006.01)
   *H01L 29/06* (2006.01)
   *G06F 111/20* (2020.01)
   *G06F 30/398* (2020.01)

(52) U.S. Cl.
   CPC .......... *H01L 27/0207* (2013.01); *H01L 29/06* (2013.01); *G06F 30/398* (2020.01); *G06F 2111/20* (2020.01)

(56) References Cited

U.S. PATENT DOCUMENTS

| | | | |
|---|---|---|---|
| 6,083,271 A | 7/2000 | Morgan | |
| 6,230,304 B1* | 5/2001 | Groeneveld | G06F 30/327 |
| | | | 716/113 |
| 6,240,541 B1 | 5/2001 | Yasuda et al. | |
| 6,266,803 B1* | 7/2001 | Scherer | G06F 30/394 |
| | | | 716/114 |
| 6,292,929 B2 | 9/2001 | Scepanovic et al. | |
| 6,317,863 B1 | 11/2001 | Segal | |
| 6,415,426 B1* | 7/2002 | Chang | G06F 30/392 |
| | | | 716/113 |
| 6,865,726 B1* | 3/2005 | Igusa | G06F 30/392 |
| | | | 716/105 |
| 7,103,863 B2 | 9/2006 | Riepe et al. | |
| 7,103,866 B2 | 9/2006 | Kashiwagi et al. | |
| 7,127,695 B2 | 10/2006 | Huang et al. | |
| 7,281,232 B1 | 10/2007 | Nicolino, Jr. et al. | |
| 7,698,675 B2 | 4/2010 | Kitano | |
| 7,739,629 B2 | 6/2010 | Wang et al. | |
| 7,743,354 B2 | 6/2010 | Albrecht et al. | |
| 7,752,588 B2 | 7/2010 | Bose | |
| 7,818,703 B2 | 10/2010 | Andreev et al. | |
| 7,895,559 B2 | 2/2011 | Bansal | |
| 7,921,393 B2 | 4/2011 | Furnish et al. | |
| 8,127,260 B1 | 2/2012 | Song et al. | |
| 8,234,615 B2* | 7/2012 | Ramji | G06F 30/392 |
| | | | 716/129 |
| 8,239,803 B2 | 8/2012 | Kobayashi | |
| 8,321,830 B2 | 11/2012 | Hannan et al. | |
| 8,627,252 B2 | 1/2014 | Quach | |
| 8,635,572 B1 | 1/2014 | Jin et al. | |
| 8,726,217 B2 | 5/2014 | Gullette | |
| 8,782,584 B2 | 7/2014 | Alpert et al. | |
| 8,788,998 B2 | 7/2014 | Hatamian et al. | |
| 8,832,629 B2 | 9/2014 | Rozen et al. | |
| 8,984,464 B1 | 3/2015 | Mihal et al. | |
| 9,384,317 B1 | 7/2016 | Salowe et al. | |
| 9,424,386 B2* | 8/2016 | Chu | G06F 30/39 |
| 9,454,634 B1 | 9/2016 | Kukal et al. | |
| 9,536,032 B2 | 1/2017 | Chiang et al. | |
| 9,785,734 B2 | 10/2017 | Jummel | |
| 9,910,950 B2 | 3/2018 | Quandt et al. | |
| 10,162,929 B2* | 12/2018 | Hsu | G06F 30/398 |
| 10,553,574 B2* | 2/2020 | Seo | H01L 27/088 |
| 10,769,342 B2* | 9/2020 | Sio | G06F 30/392 |
| 10,903,239 B2* | 1/2021 | Chang | H01L 27/11807 |
| 2005/0076319 A1 | 4/2005 | Chow et al. | |
| 2006/0030138 A1 | 2/2006 | Konishi | |
| 2007/0234266 A1* | 10/2007 | Chen | G06F 30/34 |
| | | | 716/113 |
| 2014/0181774 A1 | 6/2014 | Hatamian et al. | |
| 2015/0067616 A1 | 3/2015 | Hsu et al. | |
| 2015/0143309 A1* | 5/2015 | De Dood | G06F 30/398 |
| | | | 716/107 |
| 2016/0085900 A1 | 3/2016 | Chandra et al. | |
| 2016/0266604 A1 | 9/2016 | Krishnamurthy et al. | |
| 2016/0335389 A1* | 11/2016 | Yuan | G06F 30/398 |
| 2017/0345809 A1 | 11/2017 | Chang et al. | |
| 2019/0035811 A1* | 1/2019 | Chang | G06F 30/398 |
| 2019/0303527 A1* | 10/2019 | Tien | G06F 30/394 |

FOREIGN PATENT DOCUMENTS

| | | |
|---|---|---|
| KR | 10-2016-0031041 A | 3/2016 |
| KR | 10-2016-0063236 A | 6/2016 |
| TW | 201717075 A | 5/2017 |

\* cited by examiner

| Starting Site\End Site | S1 | S2 | S3 | S4 |
|---|---|---|---|---|
| S1 | O: ¼ (S1) | E: ½ (S1 or S2) | O: ½ (S1 or S3) | E: ½ (S1 or S2) |
| S2 | E: ½ (S2 or S1) | O: ½ (S2 or S4) | E: ½ (S2 or S3) | O: ¼ (S2) |
| S3 | O: ½ (S3 or S1) | E: ½ (S3 or S4) | O: ¼ (S3) | E: ½ (S3 or S2) |
| S4 | E: ½ (S4 or S1) | O: ¼ (S4) | E: ½ (S4 or S3) | O: ½ (S4 or S2) |

FIG. 2

CELL PLACEMENT SITE OPTIMIZATION

CROSS-REFERENCE TO RELATED APPLICATION

This application is a continuation of U.S. Non-provisional patent application Ser. No. 15/882,288, titled "Cell Placement Site Optimization," filed on Jan. 29, 2018, which claims the benefit of U.S. Provisional Patent Application No. 62/516,532, titled "Cell Placement Site Optimization," filed on Jun. 7, 2017. The entire contents of the aforementioned applications are incorporated by reference herein in their entireties.

BACKGROUND

An electronic design automation (EDA) tool can be used for an integrated circuit (IC) design flow. For example, the EDA tool can be used to place standard cells (e.g., cells that implement logic or other electronic functions) in an IC layout design. As technology increases and the demand for scaled ICs grow, EDA tools become increasingly important to aid in the design of complex IC layout designs.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

FIG. 2 is an illustration of an example table showing placement sites for standard cells based on different standard cell libraries, according to some embodiments of the present disclosure.

DETAILED DESCRIPTION

Figure 1:
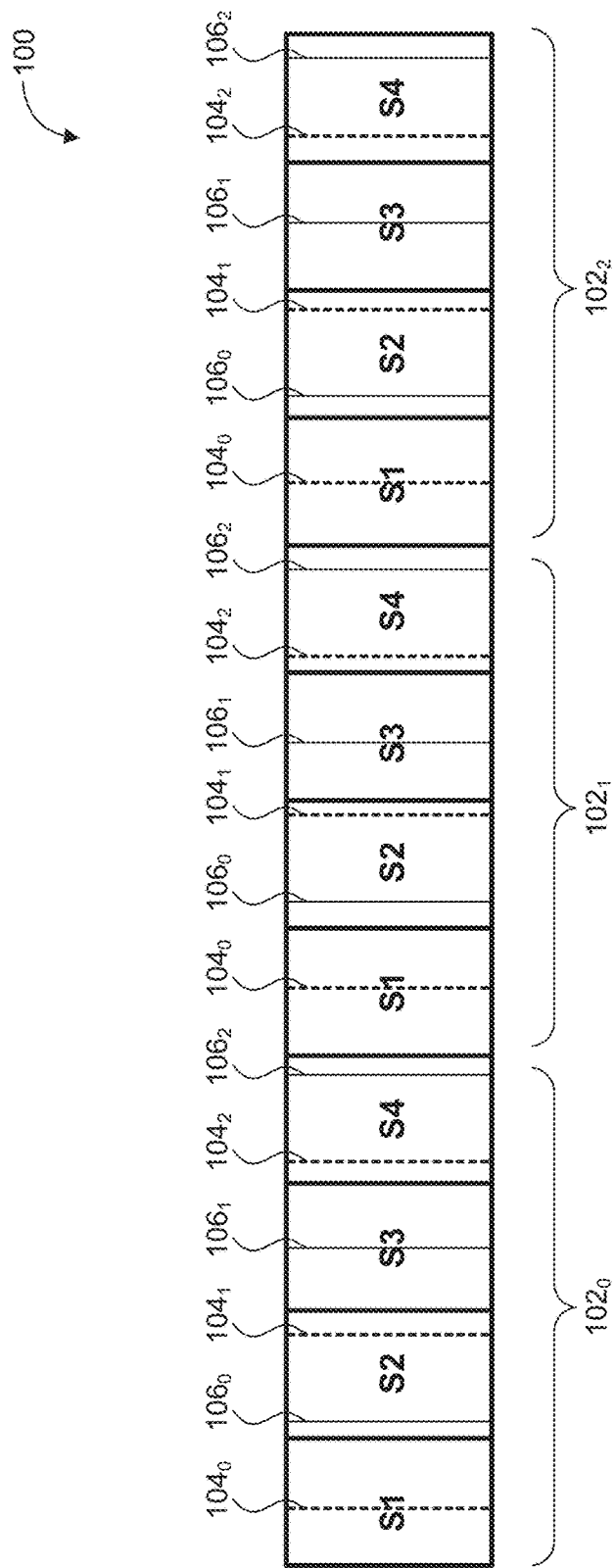
FIG. 1 is an illustration of an example layout area partitioned into multiple contiguous placement units, according to some embodiments of the present disclosure.

The following disclosure provides many different embodiments, or examples, for implementing different features of the provided subject matter. Specific examples of components and arrangements are described below to simplify the present disclosure. These are merely examples and are not intended to be limiting. In addition, the present disclosure repeats reference numerals and/or letters in the various examples. This repetition is for the purpose of simplicity and clarity and, unless indicated otherwise, does not in itself dictate a relationship between the various embodiments and/or configurations discussed.

The following disclosure relates to optimizing placement of standard cells (e.g., cells that implement logic or other electronic functions) in an integrated circuit (IC) layout design. In some embodiments, standard cells can be defined in different standard cell libraries, which define different pin locations for the standard cells. Based on the different pin locations, flexibility in the placement of the standard cells can be achieved, thus optimizing the IC layout design.

Electronic design automation (EDA) tools can be used to place standard cells in the IC layout design. The standard cells can be logic modules with pre-designed layouts. For example, a layout area of the design can be used to place standard cells that have a fixed height but different widths depending on the functionality of the standard cells. The standard cells can be laid out in rows, in which routing channels can be reserved between the rows to route interconnects to the standard cells. The interconnects can couple (or electrically connect) to inputs and outputs through terminals or pins associated with the standard cells.

FIG. 1 is an illustration of an example layout area 100 partitioned into contiguous placement units $102_0$-$102_2$, according to some embodiments of the present disclosure. Layout area 100 can be a portion of a larger IC layout design (not shown). Each of placement units $102_0$-$102_2$ can include placement sites S1-S4. One or more of placement sites S1-S4 can be used by, for example, an EDA tool for layout of one or more standard cells.

In some embodiments, standard cell can be laid across one or more of placement sites S1-S4. For example, a standard cell with a low-complexity logic function (e.g., an inverter logic function) can occupy a single placement site, such as any one of placement sites S1-S4. A standard cell with a medium complexity logic function (e.g., multiple logic gates coupled to one another to perform a specified function) can occupy multiple placement sites within one or more placement units $102_0$-$102_2$. For ease of reference, a standard cell that is laid across an odd number of placement sites—e.g., across 1, 3, 5, or 7 placement sites—is referred to herein as an "odd-width standard cell." A standard cell that is laid across an even number of placement sites—e.g., across 2, 4, 6, or 8 placement sites—is referred to herein as an "even-width standard cell."

In referring to FIG. 1, a first set of pin locations $104_0$-$104_2$ (shown as dashed lines) and a second set of pin locations $106_0$-$106_2$ (shown as solid lines) can be mapped to each of placement units $102_0$-$102_2$, according to some embodiments of the present disclosure. For explanation purposes and as shown in FIG. 1, a pin track from the first set of pin locations $104_0$ can be mapped to placement site S1, a pin track from the first set of pin locations $104_1$ and a pin track from the second set of pin locations $106_0$ can be mapped to placement site S2, a pin track from the second set of pin locations $106_1$ can be mapped to placement site S3, and a pin track from the first set of pin locations $104_2$ and a pin track from the second set of pin locations $106_2$ can be mapped to placement site S4. In some embodiments, this pin track pattern is repeated for each of placement units $102_0$-$102_2$. Placement sites S1 and S3 each have a single pin track mapped to them—e.g., pin track $104_0$ and pin track $106_1$, respectively. These pin track patterns are also referred to herein as "single-pattern S1" and "single-pattern S3." Placement sites S2 and S4 each have two pin tracks mapped to them—e.g., pin track $106_0$/pin track $104_1$ and pin track $104_2$/pin track $106_2$, respectively. These pin track patterns are also referred to herein as "double-pattern S2" and "double-pattern S4." A pitch (or spacing) between first set of pin locations $104_0$-$104_2$ and second set of pin locations $106_0$-$106_2$ can be uniform or near uniform, according to some embodiments.

In some embodiments, the first set of pin locations $104_0$-$104_2$ can be mapped to (or associated with) a first type of interconnect—e.g., a metal M0 interconnect or a metal M1 interconnect—that is used to route one or more pins associated with standard cells. Similarly, the second set of pin locations $106_0$-$106_2$ can be mapped to (or associated with) a second type of interconnect—e.g., a metal M0 interconnect or a metal M1 interconnect—that is used to route one or more pins associated with standard cells. The first and second types of interconnects can be different from one another and can have different electrical properties. For example, the first type of interconnect can have a lower resistance (e.g., wider bus width) than a resistance of the second type of interconnect.

Inputs and outputs for the standard cells can be aligned with (or along) one or more pin tracks from first set of pin locations 104 and second set of pin locations 106. The inputs and outputs of the standard cells can be available at the pin locations. Depending on electrical characteristics associated with the standard cell, one or more inputs and/or outputs may need to be electrically connected to certain pin tracks from first and second sets of pin locations 104 and 106, respectively. For example, if an input to a standard cell is required to be within a predetermined voltage range, the input can be electrically connected to a pin track (e.g., pin track 104 or pin track 106) associated with an interconnect with a wider bus width (e.g., lower resistive path) than an interconnect associated with the other pin track (e.g., pin track 104 or pin track 106).

As technology increases and the demand for scaled ICs grow, an increasing number of standard cells are required to fit in smaller IC layout designs, thus creating challenges for IC manufacturers. Embodiments of the present disclosure address this challenge, among others, by introducing different standard cell libraries with different pin locations for standard cells. In some embodiments, standard cells can have multiple pin locations for any or all of their inputs and outputs. The different standard cell libraries can define the multiple pin locations for the standard cells. With the multiple pin locations, flexibility in the placement of standard cells can be achieved, thus optimizing IC layout design.

FIG. 2 is an illustration of an example table 200 showing placement sites for standard cells based on different standard cell libraries, according to some embodiments of the present disclosure. Table 200 provides placement site information for layout area 100 of FIG. 1. Embodiments of the present disclosure are not limited to the arrangement of placement sites and pin track mappings shown in layout area 100 of FIG. 1. Other layout and pin track arrangements are within the spirit and scope of the present disclosure. Based on the other layout and pin track arrangements, additional standard cell libraries to optimize the placement of standard cells.

The different standard cell libraries provide different placement sites—and thus different pin locations—for the standard cells. The left column of table 200 indicates a starting placement site—e.g., placement sites S1-S4 of FIG. 1—for the standard cell. The top row of table 200 indicates an end placement site for the standard cell. For an odd-width standard cell that spans across 3 placement sites, if the odd-width standard cell has a start point at placement site S2, the end point would be at placement site S4. In referring to table 200, at start point placement site S2 and end point placement site S4, the table entry reads "O: ¼ (S2)," which means the following:

"O": an odd-width standard cell;

"¼": the odd-width standard cell can be placed in one-quarter of the 4 placement sites, in which the 1 placement site meets the cell's pin location requirements; and "(S2)": the 1 placement site that meets the cell's pin location requirements is placement site S2.

Similarly, for an even-width standard cell that spans across 4 placement sites with start and end points at placement sites S4 and S3 respectively, the table entry read "E: ½ (S4 or S3)," which means the following:

"E": an even-width standard cell;

"½": the even-width standard cell can be placed in one-half of the 4 placement sites, in which the 2 placement sites meet the cell's pin location requirements; and "(S4 or S3)": the 2 placement sites that meet the cell's pin location requirements are placement sites S4 and S3.

Table 200 is described in further detail below with respect to odd-width and even-width standard cells defined in base standard cell libraries with first and second pin offsets.

Figure 3:
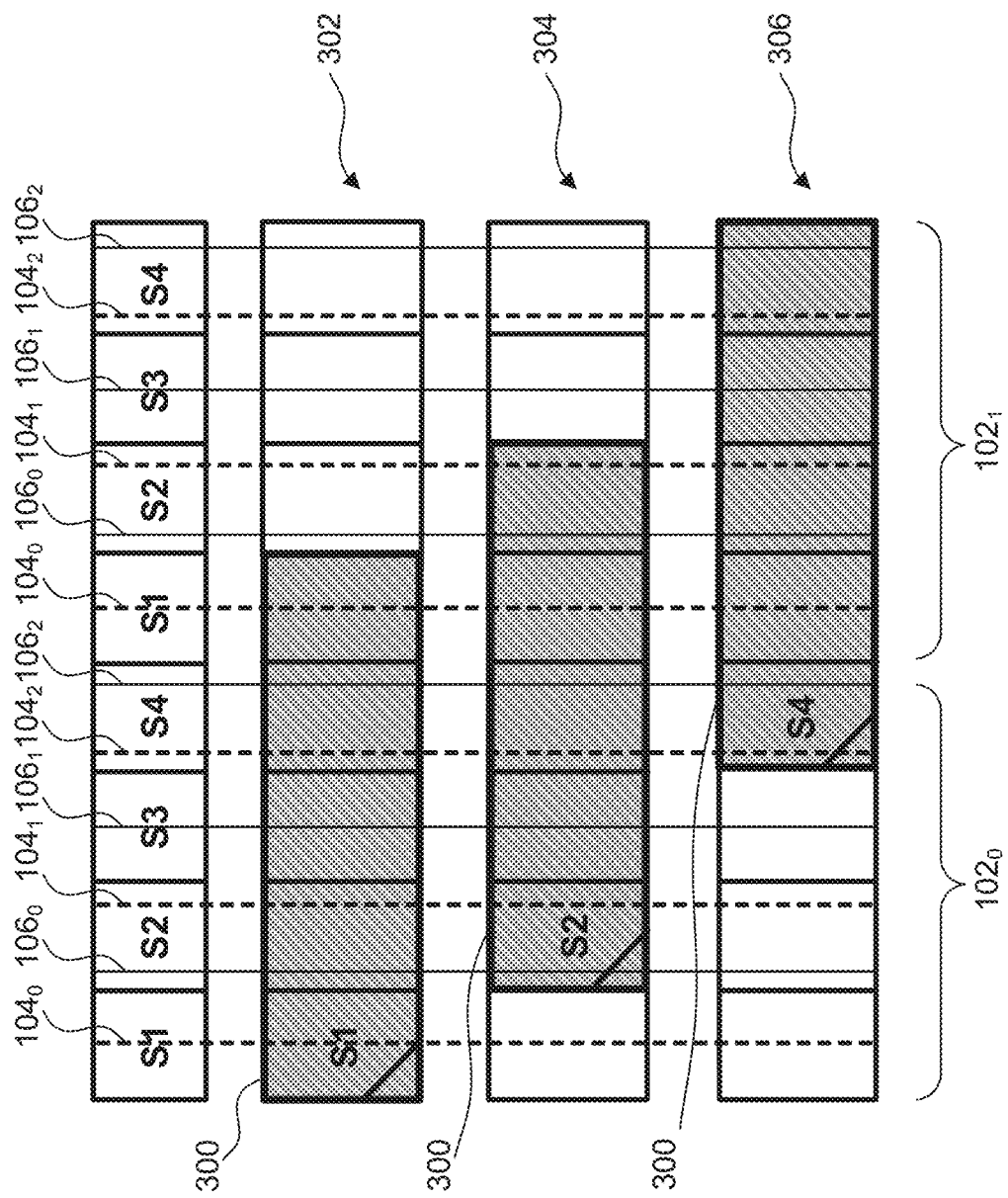
FIG. 3 is an illustration of an example odd-width standard cell with different pin location definitions, according to some embodiments of the present disclosure

FIG. 3 is an illustration of an example odd-width standard cell 300 with different pin location definitions, according to some embodiments of the present disclosure. For explanation purposes, odd-width standard cell 300 is laid across 5 placement sites. Odd-width standard cell 300 is not limited to this layout arrangement, and the number of placement sites for odd-width standard cell 300 can vary—e.g., more or less than 5 placement sites—depending on the cell's functionality. In some embodiments, different pin locations for odd-width standard cell 300 can be defined in three standard cell libraries: (i) a base standard cell library 302; (ii) a base standard cell library with a first pin offset 304; and (iii) a base standard cell library with a second pin offset 306.

In base standard cell library 302, odd-width standard cell 300 is laid across placement sites S1-S4 in placement unit $102_0$ and placement site S1 in placement unit $102_1$. With this layout arrangement, odd-width standard cell 300 can span across pin tracks in this order:

(i) single-pattern S1 with pin track $104_0$ (in placement unit $102_0$);

(ii) double-pattern S2 with pin track $106_0$ and pin track $104_1$ (in placement unit $102_0$);

(iii) single-pattern S3 with pin track $106_1$ (in placement unit $102_0$);

(iv) double-pattern S4 with pin track $104_2$ and pin track $106_2$ (in placement unit $10\_2$); and (v) single-pattern S1 with pin track $104_0$ (in placement unit $102_1$).

Based on the pin track arrangement of odd-width standard cell 300, the standard cell's placement may be limited to the layout arrangement shown in FIG. 3. In some embodiments, base standard cell library with a first pin offset 304 and base standard cell library with a second pin offset 306 provide additional pin track arrangements for odd-width standard cell 300, thus providing flexibility in the cell's placement in layout.

In base standard cell library with a first pin offset 304, the layout of odd-width standard cell 300 includes a placement site offset. In some embodiments, the placement site offset can be one placement site relative to a starting placement site defined in base standard cell library 302. Accordingly, as shown in FIG. 3, odd-width standard cell 300 can be laid across placement sites S2-S4 in placement unit $102_0$ and placement sites S1-S2 in placement unit $102_1$. With this layout arrangement, odd-width standard cell 300 can span across pin tracks in this order:

(i) double-pattern S2 with pin track $106_0$ and pin track $104_1$ (in placement unit $102_0$);
(ii) single-pattern S3 with pin track $106_1$ (in placement unit $102_0$);
(iii) double-pattern S4 with pin track $104_2$ and pin track $106_2$ (in placement unit $102_0$);
(iv) single-pattern S1 with pin track $104_0$ (in placement unit $102_1$); and
(v) double-pattern S2 with pin track $106_0$ and pin track $104_1$ (in placement unit $102_1$).

In referring to table 200 of FIG. 2, with a start point at placement site S2 and an end point at placement site S2, odd-width standard cell 300 can be placed in one-half of the 4 placement sites: either placement site S2 or placement site S4. With a start point at placement site S4, odd-width standard cell 300 can be "flipped" such that the cell's pin track order is in reverse and placed in layout in a descending placement site order, according to some embodiments. With the flipped standard cell, odd-width standard cell 300 can span across pin tracks in this order:
(i) double-pattern S4 with pin track $106_2$ and pin track $104_2$ (in placement unit $102_1$);
(ii) single-pattern S3 with pin track $106_1$ (in placement unit $102_1$);
(iii) double-pattern S2 with pin track $104_1$ and pin track $106_0$ (in placement unit $102_1$).
(iv) single-pattern S1 with pin track $104_0$ (in placement unit $102_1$); and
(v) double-pattern S4 with pin track $106_2$ and pin track $104_2$ (in placement unit $102_0$).

In addition to the 1 placement site (e.g., placement site S1) provided by base standard cell library 302, base standard cell library with a first pin offset 304 provides 2 placement sites (e.g., placement sites S2 and S4) for odd-width standard cell 300, according to some embodiments. Thus, base standard cell library with a first pin offset 304 provides additional flexibility in the placement of odd-width standard cell 300. For ease of reference, base standard cell library with a first pin offset 304 is also referred to herein as "first pin offset library 304."

In base standard cell library with a second pin offset 306, the layout of odd-width standard cell 300 includes another placement site offset. In some embodiments, the placement site offset can be three placement sites relative to a starting placement site defined in base standard cell library 302. Accordingly, as shown in FIG. 3, odd-width standard cell 300 can be laid across placement site S4 in placement unit $102_0$ and placement sites S1-S4 in placement unit $102_1$. With this layout arrangement, odd-width standard cell 300 can span across pin tracks in this order:
(i) double-pattern S4 with pin track $104_2$ and pin track $106_2$ (in placement unit $102_0$);
(ii) single-pattern S1 with pin track $104_0$ (in placement unit $102_1$);
(iii) double-pattern S2 with pin track $106_0$ and pin track $104_1$ (in placement unit $102_1$);
(iv) single-pattern S3 with pin track $106_1$ (in placement unit $102_1$); and
(v) double-pattern S4 with pin track $104_2$ and pin track $106_2$ (in placement unit $102_1$).

In referring to table 200 of FIG. 2, with a start point at placement site S4 and an end point at placement site S4, odd-width standard cell 300 can be placed in one-half of the 4 placement sites: either placement site S4 or placement site S2. With a start point at placement site S2, odd-width standard cell 300 can be flipped such that the cell's pin track order is in reverse and placed in layout in a descending placement site order, according to some embodiments. With this layout arrangement, odd-width standard cell 300 can span across pin tracks in this order:
(i) double-pattern S2 with pin track $104_1$ and pin track $106_0$ (in placement unit $102_1$);
(ii) single-pattern S1 with pin track $104_0$ (in placement unit $102_0$);
(iii) double-pattern S4 with pin track $106_2$ and pin track $104_2$ (in placement unit $102_0$);
(iv) single-pattern S3 with pin track $106_1$ (in placement unit $102_0$); and
(v) double-pattern S2 with pin track $104_1$ and pin track $106_0$ (in placement unit $102_0$).

In addition to the 1 placement site (e.g., placement site S1) provided by base standard cell library 302, base standard cell library with a second pin offset 306 provides 2 placement sites (e.g., placement sites S2 and S4) for odd-width standard cell 300, according to some embodiments. Thus, base standard cell library with a second pin offset 306 provides additional flexibility in the placement of odd-width standard cell 300. For ease of reference, base standard cell library with a second pin offset 306 is also referred to herein as "second pin offset library 306."

Figure 4:
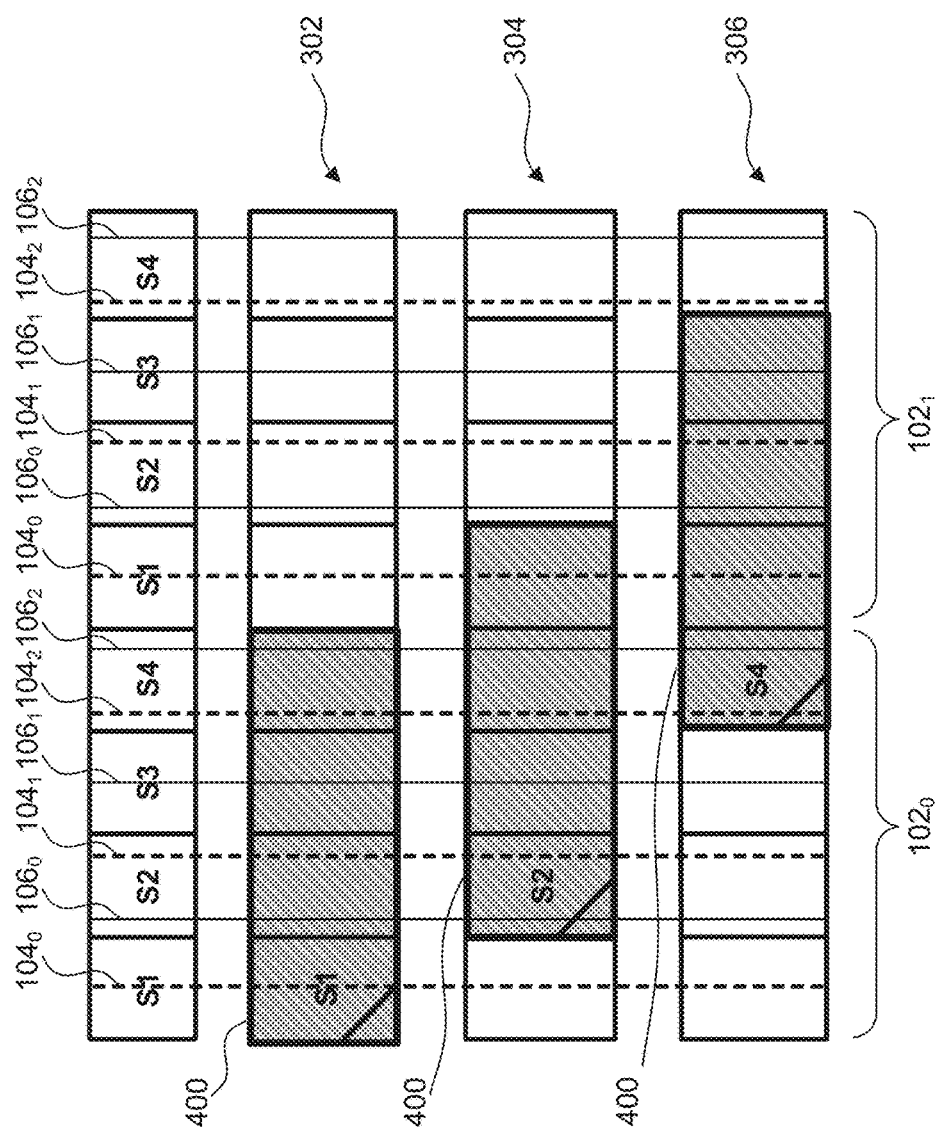
FIG. 4 is an illustration of an example even-width standard cell with different pin location definitions, according to some embodiments of the present disclosure.

FIG. 4 is an illustration of an example even-width standard cell 400 with different pin location definitions, according to some embodiments of the present disclosure. For explanation purposes, even-width standard cell 400 is laid across 4 placement sites. Even-width standard cell 400 is not limited to this layout arrangement, and the number of placement sites for even-width standard cell 400 can vary—e.g., more or less than 4 placement sites-depending on the cell's functionality. In some embodiments, different pin locations for even-width standard cell 400 can be defined in the same standard cell libraries as odd-width standard cell 300 described above: (i) a base standard cell library 302; (ii) first pin offset library 304; and (iii) second pin offset library 306.

In base standard cell library 302, even-width standard cell 400 is laid across placement sites S1-S4 in placement unit $102_0$ and placement site S1. With this layout arrangement, even-width standard cell 400 can span across pin tracks in this order:
(i) single-pattern S1 with pin track $104_0$ (in placement unit $102_0$);
(ii) double-pattern S2 with pin track $106_0$ and pin track $104_1$ (in placement unit $102_0$);
(iii) single-pattern S3 with pin track $106_1$ (in placement unit $102_0$); and
(iv) double-pattern S4 with pin track $104_2$ and pin track $106_2$ (in placement unit $102_0$).

Based on the pin track arrangement of even-width standard cell 400, the standard cell's placement may be limited to the layout arrangement shown in FIG. 4. In some embodiments, first pin offset library 304 and second pin offset library 306 provide additional pin track arrangements for even-width standard cell 400, thus providing flexibility in the cell's placement in layout.

In first pin offset library 304, the layout of even-width standard cell 400 includes a placement site offset. In some embodiments, the placement site offset can be one placement site relative to a starting placement site defined in base standard cell library 302. Accordingly, as shown in FIG. 4, even-width standard cell 400 can be laid across placement sites S2-S4 in placement unit $102_0$ and placement site S1 in placement unit $102_1$. With this layout arrangement, even-width standard cell 400 can span across pin tracks in this order:

(i) double-pattern S2 with pin track $106_0$ and pin track $104_1$ (in placement unit $102_0$);

(ii) single-pattern S3 with pin track $106_1$ (in placement unit $102_0$);

(iii) double-pattern S4 with pin track $104_2$ and pin track $106_2$ (in placement unit $102_0$); and (iv) single-pattern S1 with pin track $104_0$ (in placement unit $102_1$).

In referring to table 200 of FIG. 2, with a start point at placement site S2 and an end point at placement site S1, even-width standard cell 400 can be placed in one-half of the 4 placement sites: either placement site S2 or placement site S1. With a start point at placement site S1, even-width standard cell 400 can be flipped such that the cell's pin track order is in reverse and placed in layout in an ascending placement site order, according to some embodiments. With this layout arrangement, even-width standard cell 400 can span across pin tracks in this order:

(i) single-pattern S1 with pin track $104_0$ (in placement unit $102_1$);

(ii) double-pattern S2 with pin track $106_0$ and pin track $104_1$ (in placement unit $102_1$);

(iii) single-pattern S3 with pin track $106_1$ (in placement unit $102_1$); and (iv) double-pattern S4 with pin track $104_2$ and pin track $106_2$ (in placement unit $102_0$).

Due to the arrangement of pin tracks in layout area 100 of FIG. 1, even-width standard cell 400 can also be placed in placement sites S3 and S4. With a start point at placement site S3, even-width standard cell 400 can span across pin tracks in a similar order as placement site S2:

(i) single-pattern S3 with pin track $106_1$ (in placement unit $102_0$);

(ii) double-pattern S4 with pin track $104_2$ and pin track $106_2$ (in placement unit $102_0$);

(iii) single-pattern S1 with pin track $104_0$ (in placement unit $102_1$); and (iv) double-pattern S2 with pin track $106_0$ and pin track $104_1$ (in placement site $102_1$).

With a start point at placement site S4, even-width standard cell 400 can be flipped such that the cell's pin track order is in reverse and placed in layout in an ascending order. With this layout arrangement, even-width standard cell 400 can span across pin tracks in this order:

(i) double-pattern S4 with pin track $104_2$ and pin track $106_2$ (in placement unit $102_0$);

(ii) single-pattern S1 with pin track $104_0$ (in placement unit $102_1$);

(iii) double-pattern S2 with pin track $106_0$ and pin track $104_1$ (in placement unit $102_1$); and (iv) single-pattern S3 with pin track $106_1$ (in placement unit $102_1$).

As compared to the 1 placement site (e.g., placement site S1) provided by base standard cell library 302, first pin offset library 304 provides 4 placement sites (e.g., placement sites S1-S4) for even-width standard cell 400. Thus, first pin offset library 304 provides additional flexibility in the placement of even-width standard cell 400.

In second pin offset library 306, the layout of even-width standard cell 400 includes another placement site offset. In some embodiments, the placement site offset can be three placement sites relative to a starting placement site defined in base standard cell library 302. Accordingly, as shown in FIG. 4, even-width standard cell 400 can be laid across placement site S4 in placement unit $102_0$ and placement sites S1-S3 in placement unit $102_1$. With this layout arrangement, even-width standard cell 400 can span across pin tracks in this order:

(i) double-pattern S4 with pin track $104_2$ and pin track $106_2$ (in placement unit $102_0$);

(ii) single-pattern S1 with pin track $104_0$ (in placement unit $102_1$);

(iii) double-pattern S2 with pin track $106_0$ and pin track $104_1$ (in placement unit 102L); and (iv) single-pattern S3 with pin track $106_1$ (in placement unit $102_1$).

In referring to table 200 of FIG. 2, with a start point at placement site S4 and an end point at placement site S3, even-width standard cell 400 can be placed in one-half of the 4 placement sites: either placement site S4 or placement site S3. With a start point at placement site S3, even-width standard cell 400 can be flipped such that the cell's pin track order is in reverse and placed in layout in an ascending placement site order, according to some embodiments. With this layout arrangement, even-width standard cell 400 can span across pin tracks in this order:

(i) single-pattern S3 with pin track $106_1$ (in placement unit $102_0$);

(ii) double-pattern S4 with pin track $104_2$ and pin track $106_2$ (in placement unit $102_1$);

(iii) single-pattern S1 with pin track $104_0$ (in placement unit $102_1$); and (iv) double-pattern S2 with pin track $106_0$ and pin track $104_1$ (in placement unit $102_1$).

Due to the arrangement of pin tracks in layout area 100 of FIG. 1, even-width standard cell 400 can also be placed in placement sites S1 and S2. With a start point at placement site S1, even-width standard cell 400 can span across pin tracks in a similar order as placement site S4:

(i) single-pattern S1 with pin track $104_0$ (in placement unit $102_0$);

(ii) double-pattern S2 with pin track $106_0$ and pin track $104_1$ (in placement unit $102_0$);

(iii) single-pattern S3 with pin track $106_1$ (in placement unit $102_0$); and (iv) double-pattern S4 with pin track $104_2$ and pin track $106_2$ (in placement unit $102p$).

With a start point at placement site S2, even-width standard cell 400 can be flipped such that the cell's pin track order is in reverse and placed in layout in an ascending order. With this layout arrangement, even-width standard cell 400 can span across pin tracks in this order:

(i) double-pattern S2 with pin track $106_0$ and pin track $104_1$ (in placement unit $102_0$);

(ii) single-pattern S3 with pin track $106_1$ (in placement unit $102_0$);

(iii) double-pattern S4 with pin track $104_2$ and pin track $106_2$ (in placement unit $102_0$); and (iv) single-pattern S1 with pin track $104_0$ (in placement unit $102_1$).

As compared to the 1 placement site (e.g., placement site S1) provided by base standard cell library 302, second pin offset library 306 provides 4 placement sites (e.g., placement sites S1-S4) for even-width standard cell 400. Thus, second pin offset library 306 provides additional flexibility in the placement of even-width standard cell 400.

In view of the above, first pin offset library 304 and second pin offset library 306 can provide flexibility in the placement of standard cells in an IC layout design. For example, with respect to the pin track mapping shown in layout area 100 of FIG. 1, first pin offset library 304 can provide 4 placement options and second pin offset library 306 can provide 4 placement options for standard cells. An EDA tool can select-either automatically or by manual instruction—a standard cell from base standard cell library 302, first pin offset library 304, or second pin offset library 306 to place the standard cell in layout area 100 of FIG. 1. With the placement flexibility of standard cells provided by the disclosed embodiments, an optimized IC layout design can be achieved.

Embodiments of the present disclosure are not limited to the arrangement of placement sites and pin track mappings shown in layout area 100 of FIG. 1. Other layout and pin track arrangements are within the spirit and scope of the present disclosure. Based on the other layout and pin track arrangements, additional standard cell libraries (e.g., standard cell libraries similar to first pin offset library 304 and second pin offset library 306) can be generated—based on the embodiments disclosed herein—to optimize the placement of standard cells.

Figure 5:
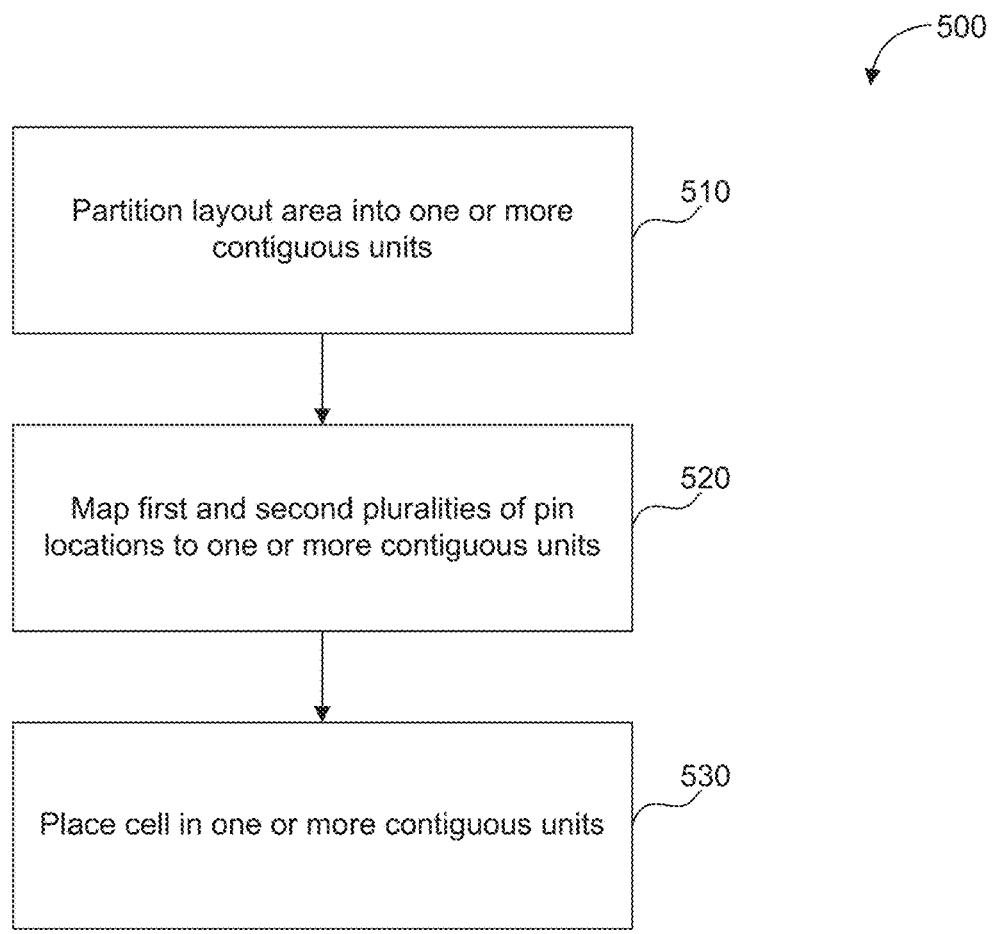
FIG. 5 is an illustration of a method for placing a standard cell in layout, according to some embodiments of the present disclosure.

FIG. 5 is an illustration of a method 500 for placing a standard cell in layout, according to some embodiments of the present disclosure. The operations depicted in method 500 can be performed by, for example, an EDA tool that operates on a computer system, such as an example computer system 600 described below with respect to FIG. 6. It is to be appreciated that not all operations may be needed to perform the disclosure provided herein and that one or more additional operations may be performed. Further, some of the operations may be performed concurrently or in a different order than shown in FIG. 5.

In operation 510, a layout area can be partitioned into one or more contiguous units, where each unit includes multiple placement sites. For example, in referring to FIG. 1, layout area 100 includes contiguous placement units $102_0$-$102_2$. Each of contiguous placement units $102_0$-$102_2$ includes placement sites S1-S4.

In operation 520, a first set of pin locations and a second set of pin locations are mapped to each of the one or more contiguous units, where each of the placement sites in each of the one or more contiguous units includes a mapping to a pin track in the first set of pin locations and/or a pin track in the second set of pin locations. For example, in referring to FIG. 1, layout area 100 includes first set of pin locations $104_0$-$104_2$ and second set of pin locations $106_0$-$106_2$ mapped to each of placement units $102_0$-$102_2$. Further, as shown in FIG. 1, a pin track from the first set of pin locations $104_0$ can be mapped to placement site S1, a pin track from the first set of pin locations $104_1$ and a pin track from the second set of pin locations $106_0$ can be mapped to placement site S2, a pin track from the second set of pin locations $106_1$ can be mapped to placement site S3, and a pin track from the first set of pin locations $104_2$ and a pin track from the second set of pin locations $106_2$ can be mapped placement site S4.

In operation 530, the standard cell is placed in the one or more contiguous units. In some embodiments, the cell is retrieved from a standard cell library that includes multiple pin locations for the standard cell—e.g., first pin offset library 304 and/or second pin offset library 306 of FIG. 3. Operation 530 includes selecting the standard cell from the standard cell library based on an allocation of one or more pins associated with the standard cell to at least one of the pin track from the first plurality of pin locations, the pin track from second plurality of pin locations, or a combination thereof. Examples of an allocation of pins associated with standard cells to pin tracks from different sets of pin locations are described above with respect to FIGS. 1-4.

One or more of the above operations described in FIG. 5 can be used to manufacture lithographic photomasks or photoreticles (also referred to herein as "reticles"), each with a predefined pattern to be used in the fabrication of an integrated circuit. The photomask or reticle can be an opaque plate with holes or transparencies that allow light to shine through the predefined pattern. The predefined pattern can be based on, for example, the standard cell placements described above with respect to FIGS. 1-4. For example, when the integrated circuit layout design is completed, the data associated with the layout design can be translated to an industry-standard format (e.g., GDSII stream format or another type of database file format). An integrated circuit manufacturer (e.g., a semiconductor foundry) can convert the industry-standard translated data into another data format used to generate the photomasks or reticles.

To fabricate one or more layers of the integrated circuit based on the predefined patterns, in a sequential manner, the photomasks or reticles can be placed in a photolithography stepper or scanner and selected for light exposure. The patterns on the photomasks or reticles can be projected and shrunk onto a surface of a wafer (e.g., semiconductor substrate). With further fabrication processing-such as the deposition of an interconnect material, one or more etching processes, and other related fabrication operations—a portion of the integrated circuit based on the predefined patterns (e.g., standard cell placements described above with respect to FIGS. 1-5) can be fabricated.

Figure 6:
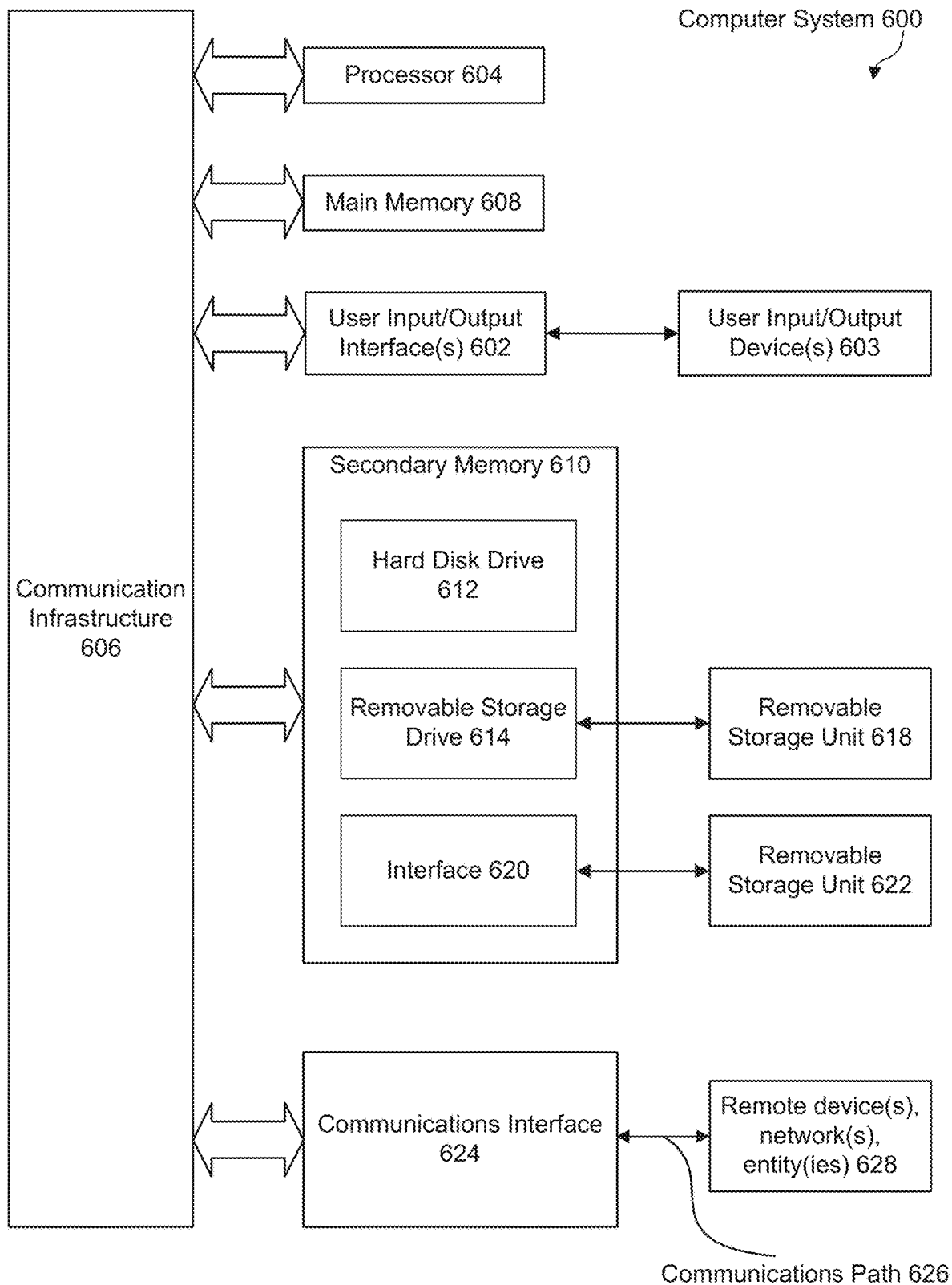
FIG. 6 is an illustration of an example computer system in which various embodiments of the present disclosure can be implemented, according to some embodiments of the present disclosure.

FIG. 6 is an illustration of an example computer system 600 in which various embodiments of the present disclosure can be implemented, according to some embodiments. Computer system 600 can be any well-known computer capable of performing the functions and operations described herein. For example, and without limitation, computer system 600 can be capable of placing standard cells in an IC layout design using, for example, an EDA tool. Computer system 600 can be used, for example, to execute one or more operations in method 500, which describes an example method for placing standard cells in layout.

Computer system 600 includes one or more processors (also called central processing units, or CPUs), such as a processor 604. Processor 604 is connected to a communication infrastructure or bus 606. Computer system 600 also includes input/output device(s) 603, such as monitors, keyboards, pointing devices, etc., that communicate with communication infrastructure or bus 606 through input/output interface(s) 602. An EDA tool can receive instructions to implement functions and operations described herein—e.g., method 500 of FIG. 5—via input/output device(s) 603. Computer system 600 also includes a main or primary memory 608, such as random access memory (RAM). Main memory 608 can include one or more levels of cache. Main memory 608 has stored therein control logic (e.g., computer software) and/or data. In some embodiments, the control logic (e.g., computer software) and/or data can include one or more of the operations described above with respect to method 500 of FIG. 5.

Computer system 600 can also include one or more secondary storage devices or memory 610. Secondary memory 610 can include, for example, a hard disk drive 612 and/or a removable storage device or drive 614. Removable storage drive 614 can be a floppy disk drive, a magnetic tape drive, a compact disk drive, an optical storage device, tape backup device, and/or any other storage device/drive.

Removable storage drive 614 can interact with a removable storage unit 618. Removable storage unit 618 includes a computer usable or readable storage device having stored thereon computer software (control logic) and/or data. Removable storage unit 618 can be a floppy disk, magnetic tape, compact disk, DVD, optical storage disk, and/any other computer data storage device. Removable storage drive 614 reads from and/or writes to removable storage unit 618 in a well-known manner.

According to some embodiments, secondary memory 610 can include other means, instrumentalities or other approaches for allowing computer programs and/or other instructions and/or data to be accessed by computer system 600. Such means, instrumentalities or other approaches can include, for example, a removable storage unit 622 and an interface 620. Examples of the removable storage unit 622 and the interface 620 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. In some embodiments, secondary memory 610, removable storage unit 618, and/or removable storage unit 622 can include one or more of the operations described above with respect to method 500 of FIG. 5.

Computer system 600 can further include a communication or network interface 624. Communication interface 624 enables computer system 600 to communicate and interact with any combination of remote devices, remote networks, remote entities, etc. (individually and collectively referenced by reference number 628). For example, communication interface 624 can allow computer system 600 to communicate with remote devices 628 over communications path 626, which can be wired and/or wireless, and which can include any combination of LANs, WANs, the Internet, etc. Control logic and/or data can be transmitted to and from computer system 600 via communication path 626.

The operations in the preceding embodiments can be implemented in a wide variety of configurations and architectures. Therefore, some or all of the operations in the preceding embodiments—e.g., method 500 of FIG. 5—can be performed in hardware, in software or both. In some embodiments, a tangible apparatus or article of manufacture comprising a tangible computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

The disclosed embodiments relate to optimizing placement of standard cells (e.g., cells that implement logic or other electronic functions) in an integrated circuit (IC) layout design. In some embodiments, standard cells can be defined in different standard cell libraries, which define different pin locations for the standard cells. Based on the different pin locations for the standard cells, flexibility in the placement of the standard cells can be achieved, thus optimizing the IC layout design.

Embodiments of the present disclosure describe a method for cell placement. The method includes partitioning a layout area into one or more contiguous units, where each unit includes a plurality of placement sites. The method also includes mapping a first plurality of pin locations and a second plurality of pin locations to each of the one or more contiguous units, where each of the plurality of placement sites in each of the one or more contiguous units includes a pin track from the first plurality of pin locations, a pin track from the second plurality of pin locations, or a combination thereof. The method further includes placing a cell in the one or more contiguous units based on an allocation of one or more pins associated with the cell to at least one of the pin track from the first plurality of pin locations, the pin track from second plurality of pin locations, or a combination thereof, where the cell is retrieved from a cell library that includes a plurality of pin locations for the cell.

Embodiments of the present disclosure describe a system with a memory and a processor. The memory is configured to store instructions. When executing the instructions, the process is configured to operations that include partitioning a layout area into one or more contiguous units, where each unit includes a plurality of placement sites. The operations also include mapping a first plurality of pin locations and a second plurality of pin locations to each of the one or more contiguous units, where each of the plurality of placement sites in each of the one or more contiguous units includes a pin track from the first plurality of pin locations, a pin track from the second plurality of pin locations, or a combination thereof. The operations further include placing a cell in the one or more contiguous units based on an allocation of one or more pins associated with the cell to at least one of the pin track from the first plurality of pin locations, the pin track from second plurality of pin locations, or a combination thereof, where the cell is retrieved from a cell library that includes a plurality of pin locations for the cell.

Embodiments of the present disclosure describe a non-transitory computer-readable medium having instructions stored thereon that, when executed by a computing device, causes the computing device to perform operations. The operations include partitioning a layout area into one or more contiguous units, where each unit includes a plurality of placement sites. The operations also include mapping a first plurality of pin locations and a second plurality of pin locations to each of the one or more contiguous units, where each of the plurality of placement sites in each of the one or more contiguous units includes a pin track from the first plurality of pin locations, a pin track from the second plurality of pin locations, or a combination thereof. The operations further include placing a cell in the one or more contiguous units based on an allocation of one or more pins associated with the cell to at least one of the pin track from the first plurality of pin locations, the pin track from second plurality of pin locations, or a combination thereof, where the cell is retrieved from a cell library that includes a plurality of pin locations for the cell.

It is to be appreciated that the Detailed Description section, and not the Abstract of the Disclosure section, is intended to be used to interpret the claims. The Abstract of the Disclosure section may set forth one or more but not all possible embodiments of the present disclosure as contemplated by the inventor(s), and thus, are not intended to limit the subjoined claims in any way.

The foregoing disclosure outlines features of several embodiments so that those skilled in the art may better understand the aspects of the present disclosure. Those skilled in the art will appreciate that they may readily use the present disclosure as a basis for designing or modifying other processes and structures for carrying out the same purposes and/or achieving the same advantages of the embodiments introduced herein. Those skilled in the art will also realize that such equivalent constructions do not depart from the spirit and scope of the present disclosure, and that they may make various changes, substitutions, and alterations herein without departing from the spirit and scope of the present disclosure.

What is claimed is:

1. A method for cell placement, comprising:
   partitioning a layout area into a plurality of placement sites;
   mapping a first plurality of pin locations and a second plurality of pin locations to pin tracks of the plurality of placement sites; and
   placing a cell in the plurality of placement sites based on an allocation of one or more pins associated with the cell to at least one of the pin tracks of the plurality of placement sites, wherein the allocation comprises a placement site offset relative to a pin track in a first placement site of the plurality of placement sites, and wherein the cell is retrieved from one of a plurality of cell libraries that assign different placement site offsets for the cell.

2. The method of claim 1, wherein partitioning the layout area comprises dividing the layout area into the plurality of placement sites, wherein each of the plurality of placement sites has substantially equal width and substantially equal height.

3. The method of claim 1, wherein mapping comprises:
   mapping a first pin track of the pin tracks of the plurality of placement sites to a first metal interconnect having a first electrical property; and
   mapping a second pin track of the pin tracks of the plurality of placement sites to a second metal interconnect having a second electrical property different from the first electrical property.

4. The method of claim 1, wherein placing the cell comprises retrieving the cell from one of the plurality of cell libraries that assign an identical pin track order for the one or more pins associated with the cell.

5. The method of claim 1, wherein placing the cell comprises:
   determining a placement site order associated with the cell based on the placement site offset;
   flipping the cell to reverse the placement site order and a pin track order of the one or more pins associated with the cell; and
   placing the flipped cell with the reversed pin track order and the reversed placement site order in the plurality of placement sites.

6. The method of claim 1, wherein placing the cell comprises:
   determining a first placement site index based on the placement site offset associated with the cell;
   determining a second placement site index based on a width of the cell;
   determining one or more contiguous placement sites of the plurality of placement sites based on the first placement site index and the second placement site index; and
   placing the cell in the one or more contiguous placement sites of the plurality of placement sites.

7. The method of claim 6, wherein determining the one or more contiguous placement sites of the plurality of placement sites comprises:
   determining a starting placement site of the plurality of the placement sites based on a parity of the width of the cell;
   determining a placement site order based on the starting placement site; and
   placing the cell in the one or more contiguous placement sites with the placement site order, wherein the one or more contiguous placement sites comprises the starting placement site.

8. The method of claim 1, wherein each of the plurality of cell libraries assigns, based on the respective placement site offset, a different starting placement site from the plurality of placement sites to the cell.

9. The method of claim 1, wherein placing the cell in the plurality of placement sites is further based on a parity of a width of the cell.

10. The method of claim 1, further comprising providing the plurality of cell libraries, wherein each of the plurality of libraries provides a standard cell with a width equal to one another, a height equal to one another, and a placement site offset different from one another, wherein placing the cell comprises selecting one of the standard cells from the plurality of cell libraries.

11. A computer system, comprising:
    a memory configured to store instructions; and
    a processor that, when executing the instructions, is configured to perform operations comprising:
      partitioning a layout area into a plurality of placement sites;
      mapping a first plurality of pin locations and a second plurality of pin locations to pin tracks of the plurality of placement sites; and
      placing a cell in the plurality of placement sites based on a placement site offset and an allocation of one or more pins associated with the cell to at least one of the pin tracks of the plurality of placement sites, wherein the cell is retrieved from one of a plurality of cell libraries that assign different placement site offsets for the cell, wherein placing the cell comprises:
        determining a first placement site index based on the placement site offset associated with the cell; and
        determining a second placement site index based on a width of the cell.

12. The computer system of claim 11, wherein to partition the layout area, the processor is configured to perform operations comprising dividing the layout area into the plurality of placement sites, wherein each of the plurality of placement sites has substantially equal width.

13. The computer system of claim 11, wherein to place the cell, the processor is configured to perform operations comprising:
    determining a placement site order associated with the cell based on the placement site offset;
    flipping the cell to reverse the placement site order and a pin track order of the one or more pins associated with the cell; and
    placing the flipped cell with the reversed pin track order and the reversed placement site order in the plurality of placement sites.

14. The computer system of claim 11, wherein to place the cell, the processor is configured to perform operations comprising:
    determining one or more contiguous placement sites of the plurality of placement sites based on the first placement site index and the second placement site index; and
    placing the cell in the one or more contiguous placement sites of the plurality of placement sites.

15. The computer system of claim 14, wherein to determine the one or more contiguous placement sites of the plurality of placement sites, the processor is configured to perform operations comprising:

determining a starting placement site of the plurality of the placement sites based on a parity of the width of the cell;

determining a placement site order based on the starting placement site; and placing the cell in the one or more contiguous placement sites with the placement site order, wherein the one or more contiguous placement sites comprises the starting placement site.

16. A non-transitory computer-readable medium having instructions stored thereon that, when executed by a computing device, causes the computing device to perform operations comprising:

partitioning a layout area into a plurality of placement sites;

mapping a first plurality of pin locations and a second plurality of pin locations to pin tracks of the plurality of placement sites; and placing a cell in the plurality of placement sites based on an allocation of one or more pins associated with the cell to at least one of the pin tracks of the plurality of placement sites, wherein the allocation comprises a placement site offset relative to a pin track in a first placement site of the plurality of placement sites, and wherein the cell is retrieved from one of a plurality of cell libraries that assign different placement site offsets for the cell.

17. The non-transitory computer-readable medium of claim 16, wherein to partition the layout area, the instructions cause the computing device to perform operations comprising dividing the layout area into the plurality of placement sites, wherein the plurality of placement sites have substantially equal height.

18. The non-transitory computer-readable medium of claim 16, wherein to place the cell, the instructions cause the computing device to perform operations comprising retrieving the cell from one of the plurality of cell libraries that assign an identical pin track order for the one or more pins associated with the cell.

19. The non-transitory computer-readable medium of claim 16, wherein to place the cell, the instructions cause the computing device to perform operations comprising:

determining a placement site order associated with the cell based on the placement site offset;

flipping the cell to reverse the placement site order and a pin track order of the one or more pins associated with the cell; and placing the flipped cell with the reversed pin track order and the reversed placement site order in the plurality of placement sites.

20. The non-transitory computer-readable medium of claim 16, wherein to place the cell, the instructions cause the computing device to perform operations comprising:

determining a first placement site index based on the placement site offset associated with the cell;

determining a second placement site index based on a width of the cell;

determining one or more contiguous placement sites of the plurality of placement sites based on the first placement site index and the second placement site index; and placing the cell in the one or more contiguous placement sites of the plurality of placement sites.

\* \* \* \* \*